United States Patent Office 2,951,017
Patented Aug. 30, 1960

2,951,017
COBALAMIN PRODUCING FERMENTATION PROCESS

John Douglas Speedie, Bebington, Wirral, and Geoffrey William Hull, Kingston-on-Thames, England, assignors to The Distillers Company Limited, Edinburgh, Scotland, a British company No Drawing. Filed Sept. 16, 1958, Ser. No. 761,298

Claims priority, application Great Britain June 27, 1957

18 Claims. (Cl. 195—96)

The present invention relates to a process for the production of cobalamins by fermentation.

By the term "cobalamins" is meant the compound cyanocobalamin (Vitamin $B_{12}$) and like compounds, for example hydroxocobalamin (Vitamin $B_{12b}$), which are converted to cyanocobalamin by the action of cyanide ions.

It is known that cyanocobalamin is produced during fermentations with various micro-organism including species of the genus Propionibacterium (as defined in Bergey "Manual of Determinative Bacteriology," 6th edition, Waverley Press, Baltimore). In published work there has been described the production of cyanocobalamin by species of this organism under either anaerobic, microaerobic or aerobic conditions, the selected conditions remaining unaltered throughout the fermentation. Yields of cyanocobalamin from such fermentations are very small, being of the order of 1 or 2 micrograms per millilitre only.

It is an object of the present invention to provide an improved process for the production of cobalamins by fermentation.

Accordingly, the present invention is a process for the production of cobalamins comprising initially fermenting a suitable liquid nutrient medium with a cobalamin-producing species of the genus Propionibacterium under substantially anaerobic conditions, and thereafter continuing the fermentation while contacting the medium with oxygen and recovering or concentrating the cobalamins contained in fermented medium withdrawn from the process.

The process of the present invention may be carried out as a batch process, that is by the fermentation of a volume of medium in a single zone or vessel, initially under anaerobic conditions and thereafter contacting the medium in the same zone or vessel with oxygen, after which the total volume of fermented medium is passed to recovery.

Alternatively the process may be carried out as a continuous process in which medium is fermented under anaerobic conditions in a first zone during which time nutrients are continuously added to this zone and partly fermented medium is continuously passed from the first zone to a second zone, wherein the medium is contacted with oxygen; the rate of addition of nutrients to the first zone and the rate of transfer of medium to the second zone being so adjusted as to maintain the volume of medium and cell concentration in the first zone substantially constant. Cobalamin-containing medium is continuously withdrawn from the second zone of such a process for the recovery or concentration of the cobalamin at such a rate as to maintain the volume of medium and cell concentration substantially constant in the second zone.

By the term "a suitable liquid nutrient medium" is meant a liquid nutrient medium which will support growth of the cobalamin-producing species of Propionibacterium and the production of cobalamins by the organism. Such media must contain, in addition to assimilable nitrogen and carbon, a source of assimilable cobalt, since the cobalamins contain this element. A source of assimilable cobalt must be added to the fermentation if insufficient is contained in the other constituents of the medium. Water-soluble inorganic salts of cobalt, such as the chloride or nitrate, are suitable sources of cobalt and these may be added to the nutrient medium to provide a concentration of cobalt in the medium, for example, in the range of about 2.5 to 5 parts per million parts of medium.

Media which have been found particularly suitable in the process of the present invention are those which contain corn steep liquor as a source of nitrogen in a concentration in excess of about 140 milligrams of nitrogen per 100 millilitres of medium and glucose of lactose in a concentration in excess of about 5% weight for volume as a source of carbon.

It is preferred that the concentration of corn steep liquor in the medium is in the range of about 200 to 400 milligrams of nitrogen per 100 millilitres of medium and the concentration of glucose or lactose in the range of about 8% to 12% weight for volume of the medium.

In a batch fermentation process the sources of nitrogen and carbon may all be included in the medium at the beginning of the fermentation or they may be added during the fermentation period and the concentrations given above refer to the total amounts of corn steep liquor, nitrogen and glucose or lactose added to the fermentation medium in such a process.

In addition to nitrogen added as corn steep liquor, other sources of nitrogen may be present, for example, it has been found desirable to control the pH value of the medium during the fermentation by the addition, as required, of ammonia, preferably as an aqueous solution.

When glucose is used as the source of carbon this is preferably added to the fermentation medium as such, but it may, if desired, be added in any other form, for example as sucrose, but if this material is used it may be necessary to invert it by adjustment of the pH value of the medium and by heating, or by enzyme action before the glucose contained in the sucrose is available to the organism. Sufficient of the material should be added to provide glucose in a concentration of at least 5% weight for volume of the medium, and preferably in a concentration of from 8% to 12%.

Lactose may also be added in any form providing this carbohydrate is utilised by the organism.

It is desirable that the carbon source is sterilised separately, since the heating of carbohydrates in the presence of the other constituents of the medium tends to result in a medium which gives lower yields than one in which the carbohydrate is separately sterilised and then added aseptically to the other sterilised constituents of the medium.

It is essential that sufficient of the carbon source is added to ensure that unassimilated carbon, for example glucose or lactose, is present when the medium is contacted with oxygen, since by this means the highest yields of cobalamins are obtained. Additional carbohydrate may be added to the medium at the time of contacting with oxygen, to ensure this, if desired.

It is preferred that glucose shall be the sole source of assimilable carbohydrate and corn steep liquor, at least initially, the sole source of nitrogen.

By the term "milligrams of nitrogen per 100 millilitres of medium" is meant milligrams of elemental nitrogen per 100 millilitres of medium, for example as estimated by the Kjeldahl method.

The fermentation to which the process of the present invention is applied is preferably carried out at about 30° C. although lower or higher temperatures, such as those in the range about 25° C. to 35° C. may be used, if desired.

The pH value of the medium during the fermentation period is suitably maintained in the range about 6.5 to 7.5 for example at about pH 7. It has been found that this can be achieved by the addition to the medium of aqueous ammonia as required.

By the term "a cobalamin-producing species of the genus Propionibacterium" is meant a species or strain of the organism which can produce at least about 2 micrograms of cobalamins (as assayed by *Ochromonas malhamensis*) per millilitre of medium when grown under suitable fermentation conditions, for example in the medium described above and under microaerobic conditions throughout the fermentation.

Species of Propionibacterium which have been found to be particularly suitable for use in the present process are *Propionibacterium freudenreichii*, *P. shermanii* and *P. technicum*, since these produce high yields of cobalamins. *Propionibacterium intermedium* has also been found suitable although this organism may give somewhat lower yields.

An aerobic conditions can be achieved in the fermentation medium either by passing a non-oxidising gas such as nitrogen or carbon dioxide through the medium and/or by maintaining an atmosphere of such a gas above the medium. Under these conditions the medium may be stirred without danger of introducing oxygen into the medium. Alternatively the medium may be kept under an oxygen-containing atmosphere without stirring or with minimal stirring only to minimise the drawing of oxygen into the medium. The latter method in particular may be adequate once the fermentation has commenced, since carbon dioxide is usually produced by the organism, and assists in maintaining anaerobic conditions in the medium.

The preferred method is to pass a non-oxidising gas such as nitrogen or carbon dioxide through the medium and to maintain an atmosphere of the same gas above the medium, at least during the early part of the anaerobic fermentation period.

While increases in the yield of cobalamins are obtained when the medium is contacted with oxygen after a period of growth under anaerobic conditions, for example after about 10% of cell growth occurring in the complete fermentation has taken place in a batch fermentation process, it is preferred, in order to obtain the highest yields of cobalamins, to contact the medium with oxygen when about 80% to 100% of the total cell growth taking place has occurred, the fermentation then being continued in the presence of oxygen until the maximum yield of cobalamins is obtained.

The amount of cell growth which has taken place in a batch fermentation may be determined by carrying out successive viable cell counts on a fermentation carried out under similar fermentation conditions for this purpose. The rate of cell growth will vary to some extent with the conditions of fermentation such as the composition of the medium, age and size of the inoculum, temperature, pH value and strain of the organism, but in the batch fermentation of nutrient media such as those previously described at about 30° C. under normal fermentation conditions, over a period of about 120 hours, an excellent increase in yield of cobalamins is obtained by contacting the medium with oxygen from about 70 to 80 hours fermentation time, until the end of the fermentation period, although earlier oxygenation, for example at 24 to 50 hours gives an increased yield of cobalamins.

In general, anaerobic conditions in a batch fermentation process should preferably be maintained for a little more than half of the total fermentation period before contacting the medium with oxygen.

When the medium is contacted with oxygen or an oxygen-containing gas it is preferred that this be done in such a manner as to maintain microaerobic rather than aerobic conditions in the medium, since excessive oxygenation tends to reduce the yield of cobalamins.

The desired conditions may be obtained by passing an oxygen-containing gas such as air through the medium at a very low rate if an efficient oxygenation device such as a diaphragm or sintered plate of large diameter is used, or at a somewhat higher rate if a less efficient oxygenation device such as an open tube or ring sparger is used. If the medium is stirred, a lower rate of oxygenation may suffice. For example, in unstirred batch fermentations of an 8000 gallon scale aeration of the medium by passing 0.01 to about 0.1 volume of air per volume of medium per minute through the medium from a ring sparger at about 80 hours fermentation time has been found to provide an excellent increase in the yield of cobalamins when compared with a fermentation carried out under microaerobic conditions throughout.

The most suitable rate of oxygenation will depend at least in part upon the type of device through which the oxygen or oxygen-containing gas is passed into the medium and upon whether the medium is being stirred. This can readily be determined by assaying the cobalamins in the fermented product of similar fermentations which have been subjected to various rates of oxygenation.

An alternative method of contacting the medium with oxygen is by stirring the medium vigorously under an atmosphere of an oxygen-containing gas. By this means the gas is drawn into the medium by the stirring and is distributed throughout the medium. The degree of oxygenation will depend upon the speed of stirring and the arrangement of the stirrer blades which may be controlled, as desired.

When the process is operated as a continuous process, the fermentation is carried out in two zones, in the first of which anaerobic conditions are maintained, as previously described. Cell-containing medium is then continuously transferred from the first zone to a second zone wherein it is contacted with oxygen, as previously described, before being withdrawn from the second zone and passed to recovery for the isolation or concentration of the cobalamins contained therein.

In order that the process may be carried out continuously over a prolonged period it is necessary that the volume of medium and concentration of cells in each zone are maintained constant during the process. This is achieved by the continuous addition of liquid nutrients to the first zone.

The rate at which nutrients are added to the first zone of the process is, in part, regulated by the desired volume of output of cells and media from the process and by the desired cobalamin content of the cell-containing medium so produced, but it is, of course, essential that the rate of introduction of liquid nutrients into the process shall not exceed the "wash-out rate" of the organism, that is the input of liquid shall not be maintained at such a rate that the concentration of cells in the process continues to decrease, although the rate of addition of nutrients may be varied temporarily during the process in such a manner as to cause a temporary increase or decrease in the concentration of cells in the vessels.

The rate at which liquid nutrients are introduced into this zone is also partly regulated by the conditions of the fermentation, for example temperature, pH, type of medium, and strain or species of organism since these conditions control the rate of growth of the organism used. A suitable rate of nutrient feed can, however, be selected by a person skilled in the art which will maintain an output of cells and fermented broth containing the desired quantity of cobalamins within the maximum production by the particular organism used under the particular conditions of fermentation.

The rate of transfer of cell-containing medium from the first to the second zone depends upon the rate of addition of nutrients to the first zone and it is so adjusted as to maintain the volume of medium and concentration of cells at a substantially constant level in the first zone when the process is operating under equilibrium conditions, that is the rate of transfer to the second zone is equated with the rate of addition of nutrients and pH-controlling liquid to the first zone.

The second zone of the process suitably consists of a fermentation vessel into which, when the process is commenced, cell-containing medium from the first zone is transferred. When the desired volume of medium is present to provide a predetermined average retention time for the cells in the second zone, cell-containing medium is continuously withdrawn from the second zone at such a rate as to maintain the volume of medium and concentration of cells in this zone substantially constant.

The rate of withdrawal of cell-containing medium from the second zone is dependent in part upon the rate of transfer of cell-containing medium from the first zone and upon the rate of addition of nutrients and/or pH-controlling liquid to the second zone.

Nutrients may, if desired, be added to the second zone in a similar manner to such additions to the first zone, together with a pH-controlling liquid such as aqueous ammonia, if necessary. It is, however, possible to add nutrients to the first zone in such concentration that sufficient unfermented nutrients are passed into the second zone to render further additions of nutrients to the latter zone unnecessary.

The added liquid nutrients, comprising sources of nitrogen, carbon and cobalt, may be added separately, if desired, but it is preferred, for ease of operation to add these in the form of a mixture having the composition of the nutrient medium before fermentation, for example as a mixture containing corn steep to give a concentration in the range 200 to 400 milligrams nitrogen per 100 millilitres, glucose (or lactose) in a concentration in the range 8 to 12 grams of carbohydrate per 100 millilitres and cobalt in a concentration in the range of about 2.75 to 5 parts per million parts of the mixture.

Cobalamins, for example cyanocobalamin, may be recovered at the completion of the fermentation by separating the bacterial cells from the fermented liquid withdrawn from the process, treating the separated cells with aqueous acid to release the cobalamins and then purifying the cobalamins by alternate extractions into organic and aqueous solutions. If the solid cobalamins are required they may be obtained by precipitation from aqueous solution by the addtion of a non-solvent, such as acetone.

If impure cobalamins only are required, for example as animal feed supplements, the fermented product may be dried and used in this form.

It is believed that when a fermentation is carried out according to the present invention the production of compounds which are converted into cobalamins when the cell-containing medium is contacted with oxygen is stimulated with the result that higher yields of cobalamins are given by the process of the present invention when compared with a fermentation carried out under anaerobic or aerobic conditions throughout. In particular it appears from electrophoretic examinations of the fermented medium from the present process at various times of fermentation that the production of the compound Factor B is stimulated under the initial anaerobic conditions. Factor B is the name given to that portion of the cyanocobalamin molecule remaining when the 5:6 dimethyl benzimidazole, ribose and phosphate portions of the cyanocobalamin molecule are removed.

The following examples are given to illustrate the process of the present invention.

The assays of cobalamins in the following examples were carried out microbiologically using the organism *Ochromonas malhamensis* and in some cases also by the chemical method of Rudkin and Taylor. In all cases the assay figure is the total cobalamin content, including the cobalamin content of the Propionibacterium cells and of the liquid medium.

EXAMPLE 1

Three fermentation vessels, A, B and C were set up containing the following nutrient medium.

Corn steep liquor≡315 milligrams nitrogen/100 mls. medium

Glucose (anhydrous separately sterilised)=10% weight per volume of medium

Cobalt (as $CoCl_2.6H_2O$)=2.7 parts/million parts medium

The medium in the vessels was inoculated with *Propionibacterium freudenreichii* and fermentation was allowed to continue at a temperature of 30° C. under the conditions of aeration described below, during which time the medium in the vessels was maintained under an atmosphere of air and stirred at a speed sufficient only to maintain the solids evenly suspended thereby providing substantially anaerobic conditions in the medium. During fermentation the pH value of the medium was maintained at about 7 by additions of aqueous ammonia as required.

Vessel A was allowed to ferment for 120 hours without aeration throughout the whole of the fermentation period.

Vessel B was aerated from 70 hours to the end of the fermentation at about 120 hours through an open tube having an internal diameter of $\frac{1}{200}$ of that of the fermentation vessel at a rate of about 0.5 volume per volume of medium per minute.

Vessel C was oxygenated with pure oxygen from 70 hours to the end of the fermentation through a similar device to that of Vessel B at a rate of 0.1 volume of oxygen per volume of medium per minute.

At the completion of the fermentation the cobalamin content of the fermentations was assayed using *Ochromonas malhamensis* as the test organism.

Vessel A yielded 4.6 micrograms of cobalamin per millilitre of medium, Vessel B yielded 11.0 micrograms of cobalamin per millilitre of medium and Vessel C yielded 19.1 micrograms of cobalamin per millilitre of medium.

EXAMPLE 2

Two fermentation Vessels A and B were set up containing the following nutrient medium.

Corn steep liquor≡315 milligrams nitrogen/100 mls. medium

Glucose (anhydrous separately sterilised)=10% weight per volume of medium

Cobalt (as $CoCl_2.6H_2O$)=5 parts per million parts of medium

The medium in the vessels was inoculated with a culture of *Propionibacterium freudenreichii* and fermentation was carried out at 30° C. as described below. The pH value of the medium was maintained at about 7 by the addition of aqueous ammonia as required.

Vessel A

The medium was stirred briskly throughout the fermentation period of 120 hours under an atmosphere of air but without other aeration in order to provide microaerobic conditions in the medium.

Vessel B

Nitrogen was introduced above the medium and a slight positive pressure of this gas was maintained above the medium for 82 hours. The medium was stirred slowly at intervals.

After 82 hours fermentation time the medium was stirred continuously and was contacted with oxygen by passing air through it from an open ended tube. These conditions were maintained until the end of the fermentation at 120 hours fermentation time.

Assay of the fermented product gave a maximum yield of cobalamins for Vessel A of 8.5 micrograms per millilitre of medium and for Vessel B 13.3 micrograms per millilitre.

EXAMPLE 3

Three fermentation vessels A, B and C were set up containing 75 gallons of the following media:

Corn steep liquor≡315 milligrams nitrogen/100 mls. medium
Glucose (anhydrous separately sterilised)=10% weight per volume of medium
Cobalt (as $CoCl_2.6H_2O$)=5 parts per million parts of medium Vessel A was inoculated with a culture of *Propionibacterium shermanii*, Vessel B with a culture of *Propionibacterium technicum* and Vessel C with a culture of *Propionibacterium freudenreichii*.

The medium in all vessels was not stirred for the first 80 hours of fermentation and was maintained under an atmosphere of nitrogen at a small positive pressure (2 lbs./sq. inch).

The pH value of the medium was maintained throughout at about 7 by the addition of aqueous ammonia as required.

At 70 hours fermentation time the medium in the vessels was stirred and air was passed through the medium at a rate of 0.1 volume per volume of medium per minute until the completion of the fermentation at 168 hours fermentation time.

The cobalamin content of the fermented product was assayed mircrobiologically using *Ochromonas malhamensis* and chemically by the method of Rudkin and Taylor.

The results of the assay were as follows:

Vessel A (*P. shermanii*) 23 micrograms cobalamins per millilitre of medium
Vessel B (*P. technicum*) 22 micrograms cobalamins per millilitre of medium
Vessel C (*P. freudenreichii*) 21 micrograms cobalamins per millilitre of medium By way of comparison a similar medium was inoculated in three fermentation vessels with the same organisms and fermentation was allowed to proceed under the same conditions with the exception that the medium was not aerated and remained unstirred thus providing anaerobic conditions in the medium throughout the fermentation period.

The maximum yields of cobalamins were as follows:

*Propionibacterium shermanii* 1.8 micrograms/ml. of medium
*Propionibacterium technicum* 2.6 micrograms/ml. of medium
*Propionibacterium freudenreichii* 2.6 micrograms/ml. of medium

EXAMPLE 4

A fermentation vessel containing 500 gallons of a medium similar to that described in Example 3 was set up and the medium inoculated with a culture of *Propionibacterium freudenreichii*.

The fermentation was allowed to continue for a period of 90 hours when 80% to 90% of the total cell growth had occurred, under an atmosphere of nitrogen at a small positive pressure while stirring the medium slowly (33 revolutions per minute) thus providing anaerobic conditions in the medium.

At 90 hours fermentation time a further 2% weight for volume of glucose was added and the medium was aerated by passing air through the medium at a rate of 0.05 volume per volume of medium per minute. The rate of stirring was maintained unchanged and the fermentation was continued for a further 78 hours after which the fermented product was assayed microbiologically, using the organism *Ochromonas malhamensis* and chemically by the method of Rudkin and Taylor.

The cobalamin content was found to be 20 micrograms per millilitre of medium.

EXAMPLE 5

A fermentation vessel was set up containing 75 gallons of the following medium:

Corn steep liquor≡78 milligrams nitrogen per 100 ml. medium
Dried autolysed yeast=237 milligrams nitrogen per 100 millilitres of medium
Glucose (anhydrous separately sterilised)=10% weight per volume of medium
Cobalt (as $CoCl_2.6H_2O$)=5 parts per million parts of medium The medium was inoculated with a culture of *Propionibacterium shermanii* and the fermentation was allowed to proceed under an atmosphere of air but without stirring to provide substantially anaerobic conditions for 24 hours after which the medium was stirred rapidly at 195 revolutions per minute thus contacting the medium with air for a further 120 hours. The pH value of the medium was maintained at about 7 by means of ammonia additions. The fermented product was then assayed microbiologically and chemically and was found to contain 10 micrograms cobalamins per millilitre of medium which although lower than the yield from this organism under the conditions in Example 3 is greater than that obtained when the fermentation is carried out under microaerobic conditions throughout.

EXAMPLE 6

Two fermentation vessels, A and B, were set up containing 7 litres of the following nutrient media.

*Vessel A*

Meat extract≡630 milligrams nitrogen per 100 mls. of medium
Glucose (anhydrous separately sterilised)=10% weight per volume of medium
Cobalt (as $CoCl_2.6H_2O$)=2.75 parts per million parts of medium

*Vessel B*

Autolysed penicillium mycelium (autolysed for about 7 days at 37° C. and filtered; filtrate used)=315 milligrams nitrogen per 100 mls. medium
Glucose (anhydrous separately sterilised)=10% weight per volume of medium
Cobalt (as $CoCl_2.6H_2O$)=2.75 parts per million parts of medium The media were inoculated with a strain of *Propionibacterium freudenreichii* and fermentation was allowed to continue under anaerobic conditions for 80 hours when about 80% of the total cell growth occurring in the fermentation had taken place after which air was passed through the medium at a rate of 0.5 volume/volume/minute until the end of the fermentation period at 118 hours.

The pH value of the medium was maintained at about 7 by additions of aqueous ammonia as required.

The maximum yield of cobalamins in Vessel A was 7.4 micrograms/ml. of medium and in Vessel B 11.4 micrograms/ml. of medium.

By way of comparison similar fermentations were carried out at the same time with stirring under an atmosphere of air to provide microaerobic conditions throughout the fermentation period. The maximum yield of cobalamins from these fermentations was 4.0 in the case of the meat extract medium and 6.6 micrograms/ml. of medium in the case of the medium containing penicillium mycelium autolysate.

EXAMPLE 7

A fermentation vessel containing the following nutrient medium was set up

Corn steep liquor≡315 milligrams nitrogen per 100 mls. medium

Lactose (anhydrous, separately sterilised)=10% weight per volume of medium

Cobalt (as $CoL_2.6H_2O$)=2.75 parts per million parts of medium

The medium was inoculated with a strain of *Propionibacterium shermanii* and fermentation was allowed to proceed at 30° C. under nitrogen at a slight positive pressure for 82 hours fermentation time. Nitrogen was also passed through the medium for the first hour of the fermentation period at a rate of 0.1 volume per volume of medium per minute.

At 82 hours fermentation time air was passed through the medium at a rate of approximately 0.5 volume per volume of medium until the end of the fermentation period at 142 hours fermentation time.

The pH value in each fermentation was maintained at about 7 by addition of aqueous ammonia as required.

Upon assay using the organism *Ochromonas malhamensis* the maximum yield of cobalamins was found to be 13 micrograms per ml. of medium.

By way of comparison a similar fermentation was carried out in which microaerobic conditions were maintained throughout the fermentation period by stirring the medium briskly under an atmosphere of air.

The maximum yield of cobalamins in the fermentation was 5.8 micrograms per ml. of medium.

EXAMPLE 8

A fermentation vessel containing 7 litres of the following medium was set up

Corn steep liquor≡315 milligrams nitrogen per 100 mls. medium

Inverted sucrose (separately sterilised)=10% weight per volume of medium

Cobalt (as $CoCl_2.6H_2O$)=2.75 parts per million parts of medium

The medium was inoculated with a strain of *Propionibacterium freudenreichii* and fermentation was allowed to continue at 30° under anaerobic conditions for 82 hours, after which air was passed through the medium at a rate of 0.5 volume/volume/minute until the end of the fermentation period at 118 hours.

The pH value of the medium was maintained at about 7 by additions of aqueous ammonia as required.

The maximum yield of cobalamins was 16.7 micrograms/ml. of medium.

By way of comparison a similar fermentation carried out with brisk stirring under an atmosphere of air to provide microaerobic conditions throughout the fermentation period gave a maximum yield of 7.2 micrograms of cobalamins per ml. of medium.

EXAMPLE 9

A fermentation vessel was filled with 9500 gallons of a nutrient medium having the following composition:

Corn steep liquor=4½ weight per volume of medium (≡315 milligrams of nitrogen per ml. medium)

Glucose (anhydrous separately sterilised)=10% weight per volume of medium

Cobalt (As $CoCl_2.6H_2O$)=5 parts per million parts of medium

The medium was inoculated with a culture of *Propionibacterium freudenreichii* and flushed with nitrogen by passing this gas through the medium from a ring sparger. The fermentation was then allowed to continue at 30° C. for about 82 hours fermentation time under an atmosphere of nitrogen at a slight positive pressure.

During the fermentation the pH value of the medium was maintained at about 7 by ammonia additions as necessary.

After 82 hours fermentation time the medium was aerated by passing air through the medium from the ring sparger at a rate of 0.005 volume per volume of medium per minute until the completion of the fermentation at 140 hours.

The fermented medium was assayed for cobalamins by bioassay, using the organism *Ochromonas malhamensis* and by chemical assay using the meethod of Rudkin and Taylor and was found to contain 24.3 micrograms of cobalamin per millilitre of medium.

EXAMPLE 10

Two fermentation vessels, A and B, were set up containing 7 litres of a nutrient medium of the following composition:

Corn steep liquor≡315 milligrams nitrogen per 100 mls. of medium

Gluclose (anhydrous separately sterilised)=10% weight per volume of medium

Cobalt (as $CoCl_2.6H_2O$)=2.75 parts per million parts of medium

The medium in each vessel was inoculated with a strain of *Propionibacterium freudenreichii* and fermentation was allowed to proceed at 30° C. under the following conditions. The pH value of the medium was controlled at about pH 7 by additions of aqueous ammonia as required.

Vessel A

The fermentation was carried out under air and the medium was briskly stirred throughout the fermentation period of 118 hours to draw air into the medium to provide microaerobic conditions therein.

Vessel B

This fermentation was also carried out under air and brisky stirred as for Vessel A but at 70 hours fermentation time, when about 80% of the total cell growth had occurred air was also passed through the medium from a single jet at a rate of 0.5 volume/volume/minute and this continued until the end of the fermentation period at 118 hours.

The maximum yield of cobalamins in Vessel A was 7.7 micrograms/ml. of medium and in Vessel B. 7.7 micrograms/ml. of medium showing that aeration at 70 hours after maintaining microaerobic conditions in the medium does not increase the yield of cobalamins when compared with a fermentation carried out under microareobic conditions throughout.

EXAMPLE 11

A fermentation vessel containing 7 litres of the nutrient medium described in the previous example was set up and the medium was inoculated with a strain of *Propionibacterium freudenreichii*. Fermentation was allowed to continue at 30° C. under anaerobic conditions for 46 hours, when about 10% of the total cell growth had occurred, after which air was passed through the medium at a rate of 3.5 litres per minute through an open tube until the end of the fermentation period at 118 hours. The pH value of the medium was maintained at about pH 7 throughout by additions of aqueous ammonia as required.

The maximum yield of cobalamins was 11.6 micrograms/ml. of medium.

By way of comparison similar fermentations carried out under anaerobic and microaerobic conditions throughout the fermentation period gave maximum yields of cobalamins of 4.8 micrograms/ml. of medium and 6.8 micrograms/ml. of medium respectively.

EXAMPLE 12

Four fermentation vessels A, B, C and D were set up containing 7 litres of a medium including glucose at a concentration of 10% weight per volume of medium and cobalt (as $CoCl_2.6H_2O$) at a concentration of 5 parts per million parts of medium and corn steep liquor in the following concentrations:

Vessel A≡140 mgms. nitrogen/100 mls. medium
Vessel B≡175 mgms. nitrogen/100 mls. medium
Vessel C≡245 mgms. nitrogen/100 mls. medium
Vessel D≡385 mgms. nitrogen/100 mls. medium The media in the vessels was then inoculated with a culture of Propionibacterium freudenreichii and fermentation was allowed to proceed at 30° C. without aeration and under nitrogen at a small positive pressure for 82 hours' fermentation time, when about 80% to 90% of total cell growth had occurred. The pH value of the medium was maintained at about 7 by additions of aqueous ammonia as necessary.

At 82 hours' fermentation time air was passed through the medium 0.5 volume/volume/minute and this was continued until the end of the fermentation at 142 hours' fermentation time.

The media upon assay using the organism Ochromonas malhamensis was found to contain the following maximum yields of cobalamins:

Vessel A  11.3 micrograms/ml. of medium
Vessel B  13.1 micrograms/ml. of medium
Vessel C  14.1 micrograms/ml. of medium
Vessel D  15.6 micrograms/ml. of medium

EXAMPLE 13

A fermentation is set up comprising two interconnected fermentation vessels, the first vessel having provisions for a continuous liquid nutrient feed of corn steep liquor (equivalent to 315 mgms. of nitrogen/100 mls. of medium) glucose (10 grams per 100 millilitres of medium) and cobalt (2.75 parts per million parts of medium) as cobalt chloride. A separate feed of aqueous ammonia solution to control the pH of the fermentation is also provided to both fermentation vessels.

At the commencement of the fermentation sterile nutrient medium having the same composition as the nutrient feed noted above is added to the first fermentation vessel and the medium is seeded with a culture of Propionibacterium freudenreichii. The organism is then allowed to grow for 100 hours at 30° C. During this time the pH of the fermentation is maintained between 6.7 and 7.0 by additions of aqueous ammonia as required.

At the end of the period a continuous feed of nutrient medium as described above is commenced at a rate of 1/25 of the volume in the first zone per hour. Aqueous ammonia is also added as necessary to control the pH.

The fermenting medium is mechanically stirred in the presence of air above the medium, to provide micro-aerobic conditions in the medium in this vessel.

When the fermentation has reached the desired volume partly fermented nutrient medium and cells are allowed to overflow continuously into a second fermentation vessel.

This vessel is provided with mechanical stirring and is aerated at a rate of 5/6 of the fermentation volume per minute through an open ended tube.

When the volume of the second vessel reaches the same level as the first vessel, partly fermented medium and cells are allowed to overflow continuously and this material is collected.

No feeds of fresh nutrient are provided to the second vessel although pH control is maintained by ammonia additions as necessary in the range 6.7 to 7.0.

Assays of the cobalamin content of the partly fermented medium and cells passing from the first fermentation vessel to the second vessel and of the medium and cells overflowing from the second fermentation vessel are carried out using Ochromonas malhamensis (since cyanide ions are present in the assay method used, the results are expressed as the content of cyanocobalamin (vitamin $B_{12}$)). The figures given in Table 1 (item 1) are those when equilibrium conditions are established in the fermentation (as shown by constant assay results and constant glucose concentrations during the period of test).

The fermentation conditions are then changed by passing a slow stream of nitrogen over the fermenting medium in the first fermentation vessel to provide anaerobic conditions in that vessel. Other conditions in both fermentations remain unaltered. Assays as described above are carried out and the values obtained when equilibrium conditions are again established, and are given in Table 1 (item 2).

A slow stream of nitrogen is then passed over the fermenting nutrient medium in the second fermentation vessel in addition to the first vessel, and the aeration in the second vessel is stopped, thus providing substantially anaerobic conditions in both vessels. Assays are then carried out and the values obtained when equilibrium conditions are established are given in Table 1 (item 3).

From the assay figures in Table 1 it can be clearly seen that there is a considerable increase during the period when equilibrium conditions were established in the first vessel.

TABLE 1

| Fermentation Conditions | | Assay Results (Cyanocobalamin, μg./ml.) | |
|---|---|---|---|
| Vessel 1. | Vessel 2 | Vessel 1 | Vessel 2 |
| 1. Stirred as described under atmosphere of air. | Stirred as described with aeration. | 2.2 | 3.1 |
| 2. Stirred as described under atmosphere of nitrogen. | Stirred as described with aeration. | 0.5 | 9.0 |
| 3. Stirred as described under atmosphere of nitrogen. | Stirred as described without aeration and under atmosphere of nitrogen. | 0.9 | 1.8 |

EXAMPLE 14

A fermentation was set up and operated as described in Example 13 with the exception that the conditions of fermentation were varied as described below.

When a condition was varied the fermentation was continued under these conditions until equilibrium conditions were established as shown by constant assay results and glucose consumption, and the figures given in Table 2 are the mean of a large number of assay results obtained during the period when equilibrium conditions were established.

*Condition A.*—The nutrient feed rate to the first vessel was maintained at 0.03 of the volume of this vessel per hour and this condition was maintained for 164 hours after equilibrium conditions in the vessel had been established.

*Condition B.*—The nutrient feed rate to the first vessel was reduced to 0.025 of the volume of this vessel per hour and this condition was maintained for 170 hours after equilibrium conditions in the vessels had been established.

It will be seen from the results in Table 2 that the variation of the nutrient feed rate within these limits had little effect upon the concentration of cobalamins in the cell-containing medium withdrawn from the second vessel, although the flow rate under Condition A was faster than under Condition B.

*Condition C.*—The nutrient feed rate was further reduced to 0.015 of the volume of the first vessel per hour and the rate of aeration to the second vessel was reduced to 0.1 volume of air per volume of medium per minute.

Equilibrium conditions were maintained for 84 hours before further variations were made.

It will be seen from Table 2 that no marked change in the concentration of cobalamins in the cell-containing medium withdrawn from the last vessel occurred as a result of this variation, although the flow rate was less than under conditions A or B.

*Condition D.*—The rate of nutrient feed to the first vessel was maintained as in condition C. The rate of aeration to the second vessel was increased to 0.3 volume of air per volume of medium per minute.

A nutrient feed of corn steep liquor only was commenced to the second vessel at a rate about 1/10 that of the feed to the first vessel. The volume of medium in the second vessel was increased by 1/10 in view of the corn steep liquor feed to this vessel in order to provide the same dilution rate in the second vessel as in condition C above.

From Table 2 it will be seen that the concentration of cobalamins in the cell-containing medium withdrawn from the process was increased by the addition of corn steep liquor to the second vessel.

*Condition E.*—The rate of nutrient feed to the first vessel was increased to 0.035 of the volume of the vessel per hour.

The rate of aeration to the second vessel was maintained at 0.3 volume of air per volume of medium per minute but the volume of medium in this vessel was increased by half as much again, thus providing a similar increase in the average retention time of the cells in the second vessel.

From Table 2 it will be seen that under these conditions the concentration of cobalamins in the cell-containing medium withdrawn from the process is slightly decreased when compared with Condition A.

TABLE 2

| Condition | Rate of nutrient feed to the first vessel (volumes of vessel/hour) | Cobalamin concentration in first vessel ($\mu$g./ml.) | Cobalamin concentration in medium withdrawn from second vessel ($\mu$g./ml.) |
|---|---|---|---|
| A | 0.03 | 0.3 | 8.3 |
| B | 0.025 | 0.4 | 8.9 |
| C | 0.015 | 0.5 | 8.2 |
| D | 0.015 | 0.4 | 12.4 |
| E | 0.035 | 0.4 | 7.7 |

EXAMPLE 15

A two stage fermentation was set up as described in Example 13 using a similar medium and strain of *Propionibacterium freudenreichii* in which the medium in the first vessel was fermented under anaerobic conditions and in the second vessel under microaerobic conditions according to the process of the present invention.

Initially both vessels were maintained at 30° C. and the cobalamin content of the medium in the first and second vessel was assayed when equilibrium conditions were established in each vessel.

The temperature of the vessels was then changed to 35° C. and the cobalamin content of the medium in each vessel again assayed when equilibrium conditions were once more established.

The process was then repeated with the temperature of the vessels maintained at 25° C.

The assay results obtained in each case are given in Table 3 below:

TABLE 3

| Temperature of 1st and 2nd Vessels | 1st Vessel Cyanocobalamin ($\mu$g./ml.) | 2nd Vessel Cyanocobalamin ($\mu$g./ml.) |
|---|---|---|
| 30° C | 0.8 | 9.8 |
| 35° C | 0.4 | 8.1 |
| 25° C | 0.6 | 7.4 |

EXAMPLE 16

A two stage fermentation was set up as described in Example 13 but using the following nutrient medium Autolysed penicillium mycelium (autolysed for 14 days at 37° C.) ≡ 430 milligrams nitrogen per 100 mls. medium Glucose (anhydrous, separately sterilised) = 10% weight per volume of medium Cobalt ≡ 2.75 parts per million parts of medium A continuous feed of this medium was provided to the first vessel at a rate of 1/30 the volume of the medium in the first vessel and the fermentation in the first vessel was carried out under anaerobic conditions and in the second vessel under microaerobic conditions, as described in Example 13.

When equilibrium conditions were established in the vessels the cobalamin content of the medium in each vessel was assayed.

The fermentation conditions in the first vessel were then changed to microaerobic conditions by stirring and passing air through the medium in this vessel at a rate of 1/3 volume per volume of medium per minute.

The cobalamin content of the medium in each vessel was again assayed when equilibrium conditions were established by way of comparison with the process of the present invention. The results of these assays are given in Table 4 below.

TABLE 4

| Fermentation Conditions | | Assay results (Cyanocobalamin, $\mu$g./ml.) | |
|---|---|---|---|
| Vessel 1 | Vessel 2 | Vessel 1 | Vessel 2 |
| Anaerobic | Microaerobic | 0.6 | 12.2 |
| Microaerobic | Microaerobic | 2.8 | 4.0 |

This application is a continuation-in-part of our previously filed application Serial No. 742,013, filed June 16, 1958.

We claim:

1. A process for the production of cobalamins comprising fermenting a suitable liquid nutrient medium with a cobalamin-producing species of the genus Propionibacterium initially under anaerobic conditions and thereafter continuing the fermentation while contacting the medium with oxygen.

2. A batch process for the production of cobalamins as claimed in claim 1 wherein the medium is contacted with oxygen when at least 10% of cell growth occurring in the fermentation is complete.

3. A batch process for the production of cobalamins as claimed in claim 1 wherein the medium is contacted with oxygen after at least 80% of the cell growth occurring in the fermentation has taken place.

4. A process as claimed in claim 1 wherein the liquid nutrient medium contains corn steep liquor in a concentration in excess of 140 milligrams of nitrogen per 100 millilitres of medium and an assimilable carbohydrate in excess of 5% weight for volume.

5. A process as claimed in claim 1 wherein the liquid nutrient medium contains an assimilable carbohydrate selected from the group consisting of glucose and lactose.

6. A process as claimed in claim 1 wherein the liquid nutrient medium contains corn steep liquor in a concentration in the range 200 to 400 milligrams of nitrogen per 100 millilitre of medium and glucose in a concentration in the range 8% to 12% weight for volume of medium.

7. A process as claimed in claim 1 wherein the nutrient medium contains assimilable carbohydrate and wherein additional assimilable carbohydrate is added to the medium when this is contacted with oxygen.

8. A process as claimed in claim 1 wherein the cobalamin-producing species of the genus Propionibacterium is selected from the group consisting of *Propionibacterium freudenreichii*, *Propionibacterium shermanii* and *Propionibacterium technicum*.

9. A process as claimed in claim 1 wherein anaerobic conditions are maintained by carrying out the fermentation under an atmosphere of a non-oxidising gas.

10. A process as claimed in claim 1 wherein the medium is contacted with oxygen by passing an oxygen-containing gas through the medium.

11. A process as claimed in claim 1 wherein the medium is contacted with oxygen by passing air through the medium at a rate in the range 0.01 to 0.1 volume per volume of medium per minute.

12. A process as claimed in claim 1 wherein the medium is contacted with oxygen by maintaining the medium under an atmosphere containing oxygen and mechanically agitating the medium.

13. A batch fermentation process for the production of cobalamins comprising fermenting a nutrient medium containing corn steep liquor in a concentration in the range 200 to 400 milligrams of nitrogen per 100 millilitres of medium, glucose in a concentration in the range 8% to 12% weight for volume of medium and a source of assimilable cobalt with a species of the genus Propionibacterium selected from the group consisting of *Propionibacterium freudenreichii*, *Propionibacterium shermanii* and *Propionibacterium technicum* at a temperature in the range about 25° C. to 35° C. under anaerobic conditions for a little more than half the fermentation period, thereafter contacting the medium with oxygen while continuing the fermentation to produce cobalamins.

14. A batch fermentation process for the production of cobalamins which comprises fermenting a nutrient medium of corn steep liquor in excess of 300 milligrams of nitrogen per 100 millilitres of medium and glucose in the proportion of 8% to 12% per volume of medium with a species of the genus Propionibacterium in the presence of a source of assimiliable cobalt at a temperature in the range 25° C. to 35° C., conducting the fermentation under anaerobic conditions for a little more than half the fermentation period thereof, and then contacting the medium with oxygen for the remainder of the fermentation to produce cobalamins.

15. A batch process which comprises fermenting a nutrient medium of corn steep liquor containing in excess of 300 milligrams of nitrogen per 100 millilitres of medium and glucose in the proportion of 8% to 12% weight per volume of medium, with a species of the genus Propionibacterium in the presence of a source of assimilable cobalt at a temperature in the range 25° C. to 35° C. conducting the fermentation under anaerobic conditions for a little more than half the period thereof, then contacting the medium with oxygen for the remainder of the fermentation and maintaining the pH value of the fermentation at about 7 to produce cobalamins.

16. A batch process which comprises fermenting a nutrient medium of corn steep liquor containing in excess of 300 milligrams of nitrogen per 100 millilitres of medium and glucose in the proportion of 8% to 12% weight per volume of medium, with a species of the genus Propionibacterium in the presence of a source of assimilable cobalt at a temperature in the range 25° C. to 35° C. conducting the fermentation under anaerobic conditions for a little more than half the period thereof, then contacting the medium with oxygen for the remainder of the fermentation and maintaining the pH value of the fermentation at about 7 by the addition of ammonia, to produce cobalamins.

17. A continuous process for the production of cobalamins comprising fermenting a suitable liquid nutrient medium under anaerobic conditions with a cobalamin-producing species of the genus Propionibacterium in a first zone while adding nutrients to this zone, passing cell-containing medium from the first zone to a second zone at such a rate as to maintain the concentration of cells and volume of medium in the first zone constant, contacting the cell-containing medium in the second zone with oxygen while withdrawing cell-containing medium containing cobalamins from the second zone at such a rate as to maintain the concentration of cells and volume of medium in the second zone constant and thereafter concentrating or recovering the cobalamins in the medium withdrawn from the second zone.

18. A continuous process for the production of cobalamins comprising fermenting a suitable liquid nutrient medium under anaerobic conditions with a cobalimin-producing species of the genus Propionibacterium in a first zone while adding nutrients to this zone and ammonia to maintain a pH value in the range 6.5 to 7.5, passing medium and cells to a second zone at such a rate as to maintain the concentration of cells and volume of medium in the first zone substantially constant, contacting the cell-containing medium in the second zone with oxygen and adding ammonia to this zone to maintain a pH value in the range 6.5 to 7.5 while withdrawing cell-containing medium from the zone at a rate such as to maintain the concentration of cells and volume of medium constant and recovering or concentrating cobalamins from the medium withdrawn from the second zone.

References Cited in the file of this patent

UNITED STATES PATENTS

| | | |
|---|---|---|
| 2,715,602 | Hargrove et al. | Aug. 16, 1955 |
| 2,764,521 | Leviton | Sept. 28, 1956 |
| 2,816,856 | Sudarsky | Dec. 17, 1957 |
| 2,842,540 | Perlman | July 8, 1958 |

OTHER REFERENCES

Bergey's Manual of Determinative Bacteriology, 7th ed., Williams & Wilkins, Baltimore, 1957, pp. 570, 571, 573, 574.

UNITED STATES PATENT OFFICE
CERTIFICATE OF CORRECTION

Patent No. 2,951,017            August 30, 1960

John Douglas Speedie et al.

It is hereby certified that error appears in the printed specification of the above numbered patent requiring correction and that the said Letters Patent should read as corrected below.

Column 2, line 16, for "of", second occurrence, read -- or --; column 9, line 62, for "4½" read -- 4½% --; column 10, line 6, for "0.005" read -- 0.05 --; line 11, for "meethod" read -- method --.

Signed and sealed this 4th day of April 1961.

(SEAL)
Attest: ERNEST W. SWIDER
Attesting Officer

ARTHUR W. CROCKER
Acting Commissioner of Patents